(12) United States Patent
Scholl et al.

(10) Patent No.: US 9,720,809 B2
(45) Date of Patent: Aug. 1, 2017

(54) DYNAMICALLY ENABLING DEBUGGING OVER THE INTERNET

(71) Applicant: Microsoft Corporation, Redmond, WA (US)

(72) Inventors: Boris M. Scholl, Redmond, WA (US); Alan Turnquist, Bellevue, WA (US); Nizar Nassar Ali Qamar, Redmond, WA (US); Brahmnes Fung, Redmond, WA (US); Sung Hon Wu, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/188,114

(22) Filed: Feb. 24, 2014

(65) Prior Publication Data

US 2014/0173565 A1    Jun. 19, 2014

Related U.S. Application Data

(63) Continuation-in-part of application No. 13/398,851, filed on Feb. 17, 2012.

(51) Int. Cl.
 *G06F 11/36* (2006.01)

(52) U.S. Cl.
 CPC ........ *G06F 11/3664* (2013.01); *G06F 11/362* (2013.01); *G06F 11/3688* (2013.01)

(58) Field of Classification Search
 CPC . G06F 11/3664; G06F 11/3668; G06F 11/362
 See application file for complete search history.

(56) References Cited

U.S. PATENT DOCUMENTS

| | | | |
|---|---|---|---|
| 6,732,330 B1 * | 5/2004 | Claussen et al. | 715/234 |
| 7,669,186 B2 | 2/2010 | Nolan et al. | |
| 7,673,180 B1 * | 3/2010 | Chen et al. | 714/38.11 |
| 7,748,033 B2 | 6/2010 | Nita et al. | |
| 8,171,346 B2 | 5/2012 | Stairs et al. | |
| 8,539,506 B2 | 9/2013 | Fanning et al. | |
| 8,589,885 B2 | 11/2013 | Maybee et al. | |
| 2004/0019670 A1 * | 1/2004 | Viswanath | 709/223 |
| 2006/0195894 A1 * | 8/2006 | Nita et al. | 726/11 |
| 2007/0113218 A1 * | 5/2007 | Nolan et al. | 717/124 |
| 2010/0235821 A1 * | 9/2010 | Baldwin et al. | 717/166 |
| 2011/0093847 A1 * | 4/2011 | Shah | 718/1 |

(Continued)

*Primary Examiner* — Viva Miller
(74) *Attorney, Agent, or Firm* — Fogarty LLP (57) ABSTRACT

Debugging capabilities for software running in a cloud-computing environment are disclosed. Embodiments enable developers to debug any process running on a virtual machine hosted in a remote data center, virtual network, or cloud services environment over the Internet through a secured connection without manually installing and configuring a remote debugging monitor. A debugger module is dynamically installed and configured on a remote machine over the Internet through an extension model. In another embodiment, a debugger module is dynamically installed and configured on a remote machine over the Internet through a remote scripting approach. A secure connection is automatically established between debugger application components and debugging components on the remote machine.

19 Claims, 6 Drawing Sheets

(56) References Cited

U.S. PATENT DOCUMENTS

| | | |
|---|---|---|
| 2012/0084758 A1 | 4/2012 | Bates |
| 2012/0102220 A1 | 4/2012 | Hopmann et al. |
| 2013/0067090 A1* | 3/2013 | Batrouni ............ H04L 67/1097 709/226 |
| 2013/0167123 A1* | 6/2013 | Dura ................... G06F 11/3664 717/127 |
| 2013/0219363 A1 | 8/2013 | Wu et al. |
| 2013/0232498 A1* | 9/2013 | Mangtani et al. ............ 718/104 |

* cited by examiner

DYNAMICALLY ENABLING DEBUGGING OVER THE INTERNET

RELATED APPLICATION

This application is a continuation-in-part of pending U.S. patent application Ser. No. 13/398,851, filed Feb. 17, 2012, the disclosure of which is hereby incorporated by reference herein in its entirety.

BACKGROUND

Debugging is the process of finding and fixing errors or "bugs" in software. Generally, developers debug a process or an instance of a computer program. A software tool referred to as a "debugger" is typically used to help software developers debug their software. Remote debugging is the process of debugging software that is running on a different machine than the machine that the developer is using to write, analyze or debug the software. A "remote debugger" tool is used by developers to do remote debugging. Remote debuggers typically have two parts. Monitor software runs on the remote machine and enables the developer's machine to attach to the remote machine and to debug software on the remote machine. Client software runs on the developer's machine and connects to the monitor thereby providing an interface for the developer to debug software on the remote machine.

Recently, it has become common for software development to be performed in a cloud-computing environment. In this context, software that a developer may want to debug is running on servers that the developer does not own or control. Instead, the servers that running the software are often located in a remote datacenter that is owned and/or administered by a third party. Additionally, the developer and third party usually do not know which machines in the cloud environment are actually running the software to be debugged. A management entity in the cloud-computing environment evaluates demand for the software and other factors, such as load-sharing requirements and machine availability, and dynamically selects which machines (and how many machines) should run the software. As a result, it is difficult for the developer to determine which servers in the cloud are running the software. In many cases, the owner or administrator of the servers in the cloud environment limit the developer's access to the servers and software so that only certain processes may be debugged.

To debug on a remote device, such as a physical or virtual machine, in existing development environments, debugging over the Internet is not secure and, therefore, not recommended. Instead, the remote device and the debugger host computer must be connected over a network or connected directly through an Ethernet cable. Additionally, the remote device must be running a remote debugging tool. Typically, administrator permission is required to install the remote tools on the remote device. Once installed, in order to communicate with the remote tools, the developer must have user access to the remote device.

Servers and other machines in the cloud-computing environment may be accessed via distributed public and/or private computer networks, such as the Internet or intranets. To connect to machines in the cloud-computing environment, the developer typically needs to use the public Internet for at least part of the connection. Even if the developer could identify which machines are running the software, some servers in the cloud environment may be difficult to access from the public Internet. As a result, it may be difficult to achieve a direct network TCP/IP connection between the developer's machine and the machine running the software to be debugged in the cloud-computing environment.

Errors, bugs, and other faults in the software may not be noticed until the software has been running for long periods of time. Accordingly, machines running the software do not need to be debuggable all the time, but only need to be configured for debugging when the developer wants to or needs to debug the software.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the invention enable developers to debug any process running on a virtual machine hosted in a remote data center, virtual network, or cloud services environment over the Internet through a secured connection without manually installing and configuring a remote debugging monitor. Embodiments do not require manual configuration on the remote machine or on the host machine to open up firewall ports or to add endpoints.

In one embodiment, a debugger module is dynamically installed and configured on a remote machine over the Internet through an extension model. In another embodiment, a debugger module is dynamically installed and configured on a remote machine over the Internet through a remote scripting approach.

Embodiments provide the ability to automatically detect debugging endpoints on a remote machine over the Internet. A consolidated list of processes that are common across an array of machines may be displayed and a debugger may be automatically attached to all of the processes simultaneously. A secure connection is automatically established between debugger application components and debugging components on the remote machine.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
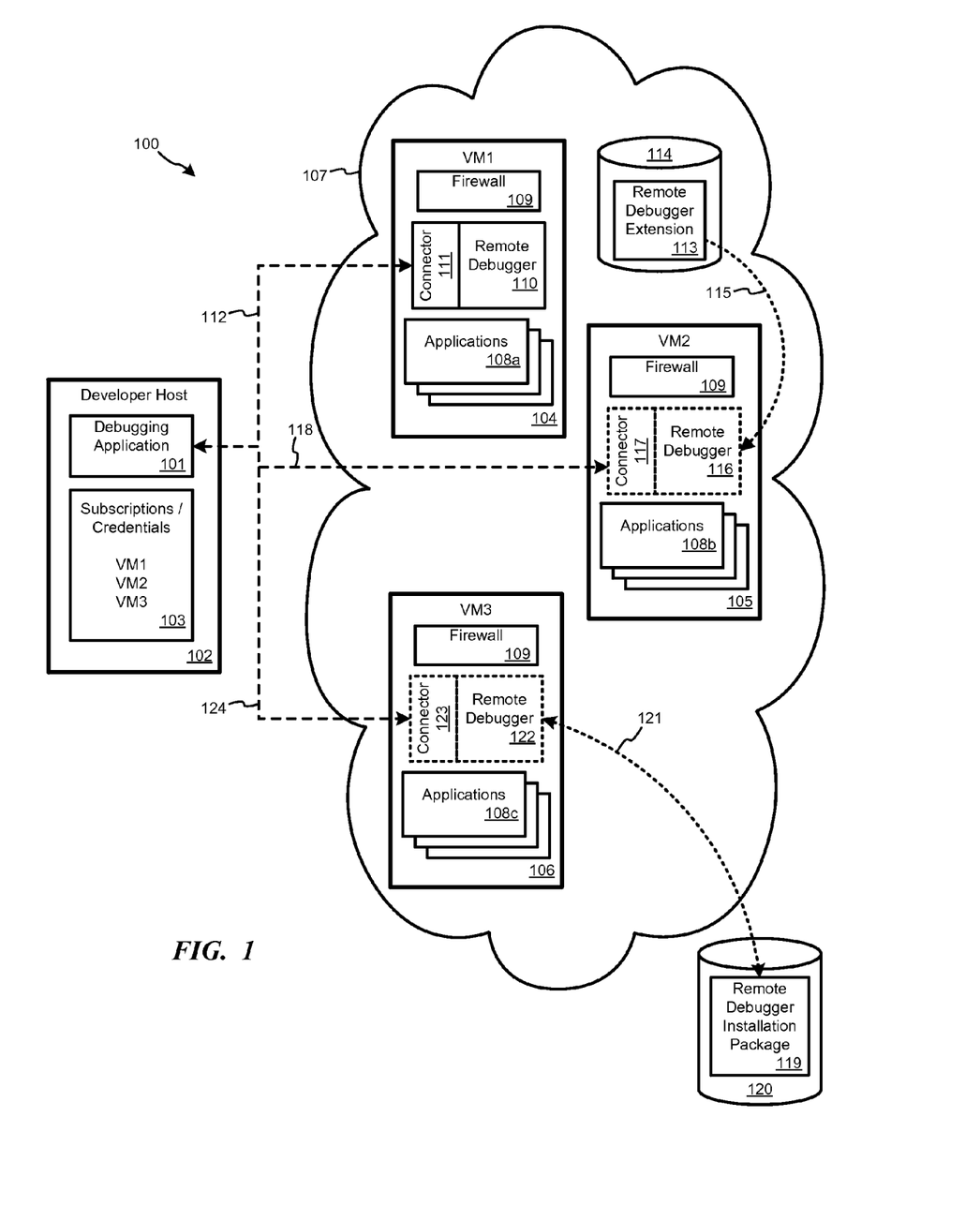
FIG. 1 illustrates a system in which a developer may debug applications over the Internet, such as applications running in a remote datacenter or applications running on distributed physical or virtual machines.

FIG. 1 illustrates a system 100 in which a developer may debug applications over the Internet, such as applications running in a remote datacenter or applications running on distributed physical or virtual machines. Debugging application running on developer's host machine 102 is used by a developer to debug software applications. Debugging application 101 may be a stand-alone application or may be a component of an integrated development environment (IDE), such as Visual Studio® from Microsoft Corporation, which allows the developer to design and debug software applications. Developer host machine 102 also maintains a list of subscriptions and/or credentials 103 that identify the cloud services, virtual machines, virtual networks, websites, and other remote physical and virtual devices that the developer has accessed or is authorized to access.

FIG. 1 further illustrates a number of virtual machines (VM) 104-106 running in a remote datacenter or virtual network 107. One or more of VMs 104-106 may be running on the same or different physical machines that are located in the same or distributed locations. In one embodiment, datacenter or virtual network 107 may provide "cloud services" or services available on demand to users via the Internet from physical and virtual servers in a cloud computing environment such as the Windows Azure cloud computing platform and infrastructure. The cloud service may provide or support for applications 108a-c that are dynamically scalable to meet user requirements and demands, such as data storage, data backup, e-mail services, hosted office applications, document collaboration services, database processing, managed technical support services, and the like.

The developer using host machine 102 typically does not know which particular physical machine or VM 104-106 is hosting an application 108a-c within datacenter or virtual network 107. Instead, based on load balancing, redundancy, and availability requirements, the datacenter or virtual network 107 may host one or more instances of an application 108a-c across multiple VMs 104-106.

Each VM 104-106 has a firewall 109 that is used to control access to public and private ports on the VM. Endpoints are created on the VMs to handle the inbound network traffic to applications 108a-c. The appropriate ports in firewall 109 are configured to allow traffic to be routed through the endpoints.

The present invention enables developers on host machine 102 to debug any process or application 108a-c running on VMs 104-106 hosted in a cloud computing environment, such as datacenter or virtual network 107, over the Internet through a secured connection without manually installing and configuring a remote debugging monitor on the VMs. Additionally, the developer does not need to manually configure the remote machine to open up firewall ports or to add endpoints.

Embodiments use a debugger extension that allows developers or an automated process to apply a remote debugger 110 to any remote virtual machine in a cloud computing environment or other datacenter or virtual network 107. The debugger extension contains a connector executable 111, which includes a controller and forwarder, a VM configuration, and remote debugger application 110, such as the msvsmon.exe remote debugging monitor from Microsoft Corporation.

The developer selects a VM 104-106 for debugging using debugging application 101. If, for example, the developer selects $VM_1$ 104 for debugging, the remote debugger 110 and connector 111 are already present on $VM_1$ 105. Debugging application 101 sets up a secure Internet connection 112 with remote debugger 110 using connector 111 to allow the developer to debug applications 108a on $VM_1$ 105. However, the remote debugger 110 may not be present on some VMs that require debugging, such as $VM_2$ 105 and $VM_3$ 106. Embodiments of the invention provide multiple ways to apply the debugger extension to an existing VM.

If, for example, the developer selects $VM_2$ 105 for debugging, the remote debugger application is not present and must be loaded on $VM_2$ 105 in order to remotely debug applications 108b. In one embodiment, debugging application 101 may make an API call to instruct cloud computing environment 107 to pull the appropriate remote debugger extension 113 from a repository 115 and apply the debugger extension to $VM_2$ 105. The remote debugger extension 113 is particularly built to work with debugging application 101 and is stored in repository 114 with other extensions for cloud computing environment 107. The extension framework reads the configuration settings and begins installing (115) and configuring the connector 117 and remote debugger 116 on $VM_2$ 105. The connector 117 will establish a secure Internet connection 118 with debugging application 101 so that the developer can begin debugging applications 108b.

In another embodiment, if there is no extension repository 114 or if the remote debugger extension 113 is not available, then a debugger package 119 stored in any arbitrary storage 120 may be installed. The storage 120 may be part of cloud computing environment 107, developer host 102, or may reside in any other location. If, for example, the developer selects $VM_3$ 106 for debugging, and the remote debugger application is not present, then a scripting approach may be used to pull (121) the remote debugger package 119 from storage 120 and apply installation package 119 to $VM_3$ 106. For example, a configuration management application, such as Windows Power Shell® from Microsoft Corporation, on $VM_3$ 106 may be used to pull the appropriate installer package file from storage. Based on the package instructions, the script installs and configures the debugger package to load remote debugger 122 and connector 123 on $VM_3$ 106. The connector 123 then establishes a secure Internet connection 124 with debugging application 101 so that the developer can begin debugging applications 108c.

The configuration of the debugger package may be similar for both the extension model and scripting approaches. Both the extension framework and the scripting approaches create two arbitrary endpoints and add them to the firewall rules of the VM. The Remote debugger 110 is configured to run under admin privileges on the VMs 104-106. The endpoints are used by debugger application 101 to connect to the endpoints and retrieve a list of processes 108a-c. The connections between the debugging application 101 and the VMs 104-106 are secured through certificates.

For example, when using a Windows Azure cloud computing platform and infrastructure, the debugging application 101 communicates with a secure WCF web service deployed on the VMs through extension or scripting mechanisms to get processes running in those VMs. The user may attach to any number of processes. For example, a round robin approach may be used to get a list of processes from all applications and instances and display them in an aggregated fashion in a custom dialog on debugging application.

Figure 2:
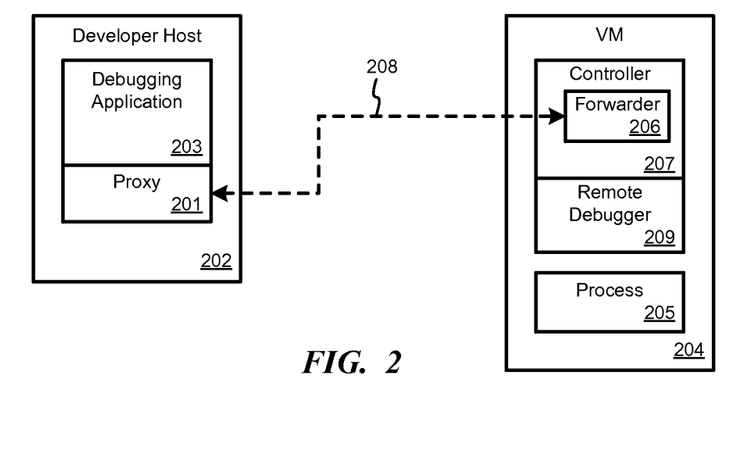
FIG. 2 illustrates a configuration according to one embodiment once a user chooses to attach to an application or process on a remote VM.

FIG. 2 illustrates a configuration according to one embodiment once a user chooses to attach to an application or process on a remote VM. A process (proxy 201) is spun up on the developer host machine 202. Proxy 201 may be part of debugging application 203 or may be a separate process. Proxy 201 communicates with the VMs 204 that is running the selected process 205 for debugging. Proxy 201 instantiate a component (forwarder 206) in the existing controller process 207 to open a port on the VM 205 for a secure TCP link 208 between proxy 201 and forwarder 206. This serves as a relay for sending any commands that the proxy 201 receives from debugging application 203 to forwarder 206.

The remote debugger 209 (e.g., msvsmon.exe) is started on VM 204 and is set up to receive commands from forwarder 206. The debugger application 203 is configured to interact with proxy 201 as if it was interacting with remote debugger 209 directly. At this point, a secure tunnel 208 is created between the debugger application 203 and remote debugger 209 (e.g., debugger application⇆Proxy⇆Forwarder⇆remote debugger) such that the debugger application 203 thinks that it is talking to the remote debugger 209 on the same machine (i.e., developer host 202) and remote debugger 209 thinks that it is receiving commands from a developer application on the same VM (i.e. on VM 205).

Figure 3:
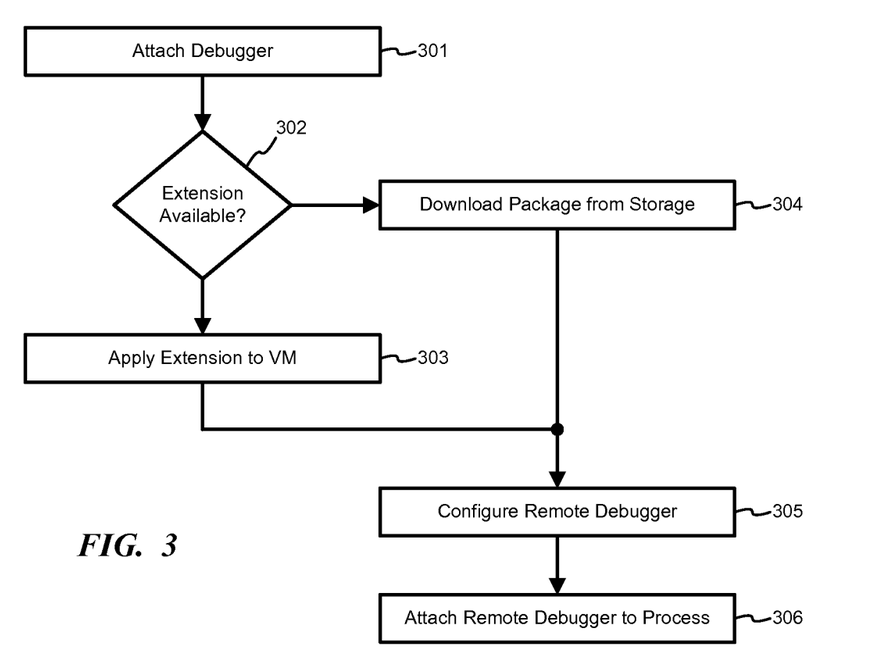
FIG. 3 is a flowchart illustrating a method for dynamically installing and configuring a remote debugger on a remote VM over the Internet through an extension model or through a remote scripting approach.

FIG. 3 is a flowchart illustrating a method for dynamically installing and configuring a remote debugger on a remote VM over the Internet through an extension model or through a remote scripting approach. In step 301, a user selects a VM and attaches a debugging application to the VM. The VM may be selected from a list of available VMs, such as a list of VMs for which the user has authorization and credentials to access. In one embodiment, the user's debugging application may automatically detect debugging endpoints on a remote VM over the Internet.

In step 302, the method determines whether a remote debugger extension is available for the selected VM. If the remote debugger extension is available, then in step 303 the extension is applied to the VM. If the remote debugger extension is not available, then in step 304 a debugger installation package is downloaded from storage using a scripting approach, such as using a configuration manager on the VM.

A list of processes available for debugging on the VMs may be displayed to the user after the extension has been applied. For example, the debugging application may show a consolidated list of processes that are common across an array of physical machines or VMs. The user may select individual processes to connect to and/or may elect to automatically attach the debugger to all of the processes simultaneously.

In step 305, the remote debugger is configured and a secure connection is automatically established between components of the debugging application and debugging components on the remote VM. In step 306, the remote debugger is then attached to the process on the VM that was selected for debugging.

Figure 4:
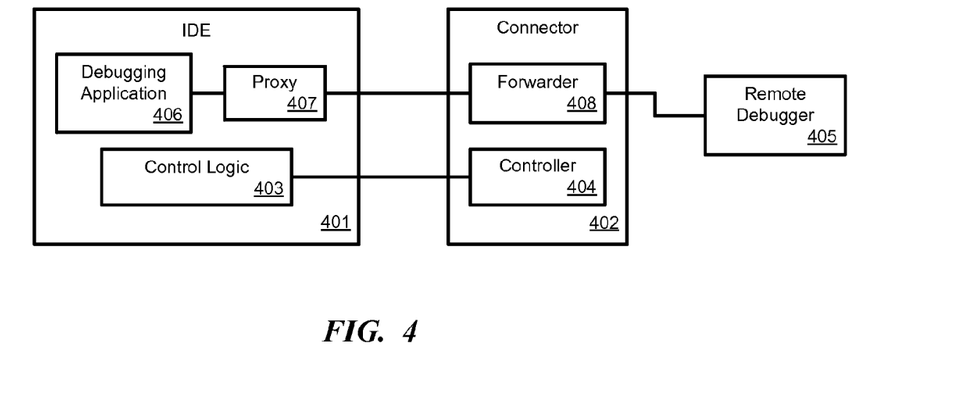
FIG. 4 is a block diagram illustrating communication flow in one embodiment of a system for remote debugging.

FIG. 4 is a block diagram illustrating communication flow in one embodiment of a system for remote debugging. An IDE 401 on a machine used by a developer communicates with a connector 402 on a remote VM. Control logic 403 in the IDE 401 communicates with a controller 404 in connector 402. Control logic 403 provides, for example, instruction to load remote debugger 405 and identifies processes for debugging to controller 404.

The debugging application 406 communicates with proxy 407, which in turn provides a secure tunnel to forwarder 408. Debugging application 406 communicates with proxy 407 as if it was communicating directly with remote debugger 405 on the same machine. Proxy 407 and forwarder 408 provide secure, authenticated communications between the developer's host machine and the remote VM. Forwarder 408 provides an interface for remote debugger 405 so that remote debugger 405 believes that it is communicating directly to debugging application 406 on the same machine.

Figure 5:
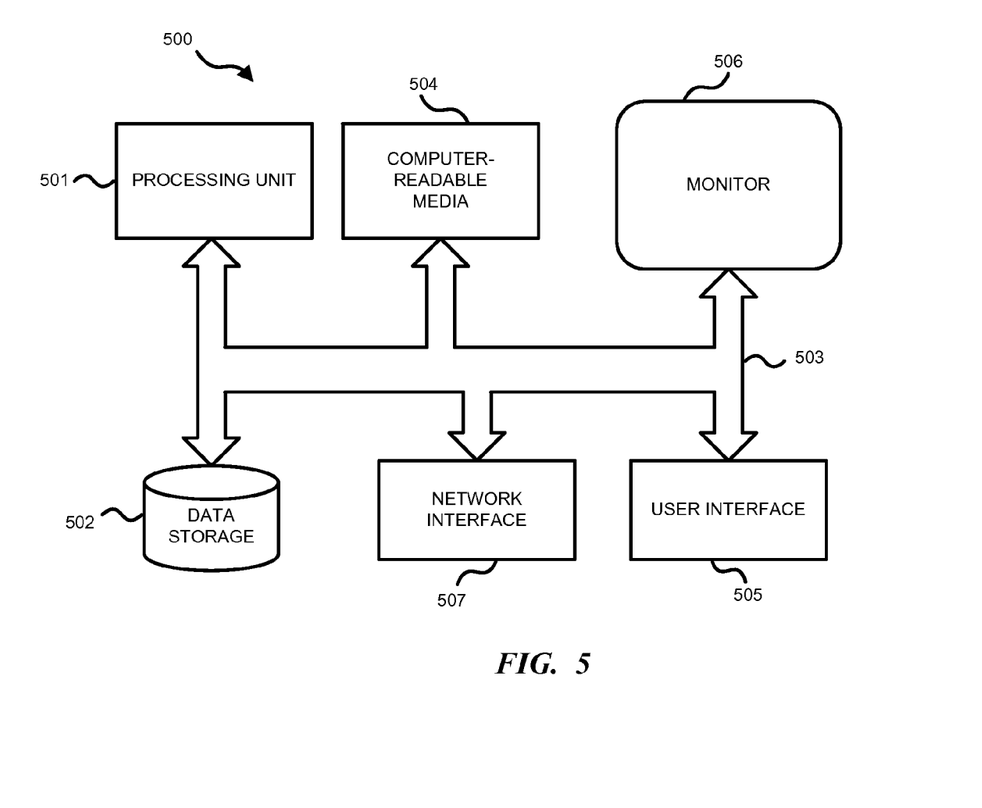
FIG. 5 illustrates an example of a computing and networking environment, such as a developer machine and/or remote cloud-based servers or virtual machines, that supports debugger clients and/or remote processes being debugged.

FIG. 5 illustrates an example of a computing and networking environment 500, such as a developer machine and/or remote cloud-based servers or VMs, that supports the debugger client and/or remote software instances being debugged as well as facilitate the connection of the developer machine and remote servers using controllers, forwarders, connectors, proxies, and control logic as described herein. The computing system environment 500 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The debug client, controller, connector, agent, monitor and software instances being debugged may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 500. Components may include, but are not limited to, various hardware components, such as processing unit 501, data storage 502, such as a system memory, and system bus 503 that couples various system components including the data storage 502 to the processing unit 501. The system bus 503 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 500 typically includes a variety of computer-readable media 504. Computer-readable media 504 may be any available media that can be accessed by the computer 501 and includes both volatile and nonvolatile media, and removable and non-removable media, but excludes propagated signals. By way of example, and not limitation, computer-readable media 504 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 500. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 502 includes computer storage media in the form of volatile and/or nonvolatile memory such as read only memory (ROM) and random access memory (RAM). A basic input/output system (BIOS), containing the basic routines that help to transfer information between elements within computer 500, such as during start-up, is typically stored in ROM. RAM typically contains data and/or program modules that are immediately accessible to and/or presently being operated on by processing unit 501. By way of example, and not limitation, data storage 502 holds an operating system, application programs, and other program modules and program data.

Data storage 502 may also include other removable/non-removable, volatile/nonvolatile computer storage media. By way of example only, data storage 502 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 5, provide storage of computer-readable instructions, data structures, program modules and other data for the computer 500.

A user may enter commands and information through a user interface 505 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 501 through a user input interface 505 that is coupled to the system bus 503, but may be connected by other interface and bus structures, such as a parallel port, game port or a universal serial bus (USB). A monitor 506 or other type of display device is also connected to the system bus 503 via an interface, such as a video interface. The monitor 506 may also be integrated with a touch-screen panel or the like. Note that the monitor and/or touch screen panel can be physically coupled to a housing in which the computing device 500 is incorporated, such as in a tablet-type personal computer. In addition, computers such as the computing device 500 may also include other peripheral output devices such as speakers and printer, which may be connected through an output peripheral interface or the like.

The computer 500 may operate in a networked or cloud-computing environment using logical connections 507 to one or more remote devices, such as a remote computer. The remote computer may be a personal computer, a server, a router, a network PC, a peer device or other common network node, and typically includes many or all of the elements described above relative to the computer 500. The logical connections depicted in FIG. 5 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 500 may be connected to a public or private network through a network interface or adapter 507. In some embodiments, a modem or other means for establishing communications over the network. The modem, which may be internal or external, may be connected to the system bus 503 via the network interface 507 or other appropriate mechanism. A wireless networking component such as comprising an interface and antenna may be coupled through a suitable device such as an access point or peer computer to a network. In a networked environment, program modules depicted relative to the computer 500, or portions thereof, may be stored in the remote memory storage device. It may be appreciated that the network connections shown are exemplary and other means of establishing a communications link between the computers may be used.

Figure 6:
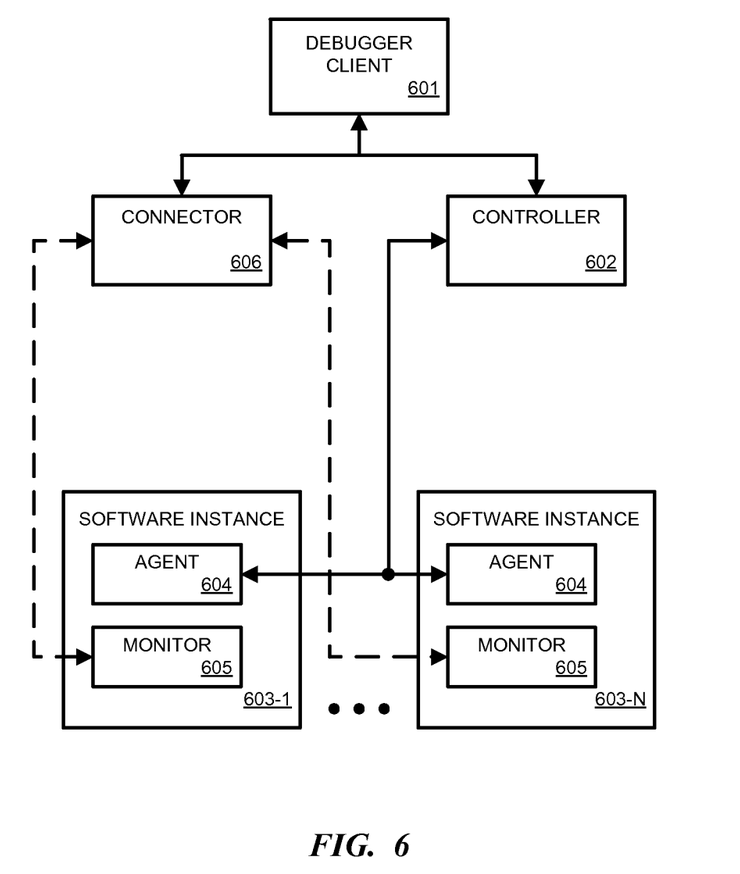
FIG. 6 is a block diagram of a system for remote debugging in a cloud environment according to one embodiment.

FIG. 6 is a block diagram of a system for remotely debugging software in a cloud environment according to one embodiment. Debugger client 601 is used by developers to debug software applications. Debugger client 601 may be a stand-alone application or is may be a component of an integrated development environment (IDE) that allows the developer to design and debug software applications. Controller 602 is a software application that identifies and monitors configuration details for the cloud environment.

Controller 602 has the capability to query the cloud environment for details about which machines are running instances 603 of the software to be debugged by the developer. Any number of software instances 603 may be running at one time. Multiple software instances 603 may be running on the same machine and/or may be spread across a number of different machines.

Controller 602 provides machine identities, process identities and any other necessary information to debugger client 601 so that the developer can debug the software instances 603 running on the various remote machines. Controller 602 may update the cloud environment details, such as machine identities and process identities for the software instances 603 to be debugged interest, on constant basis so debugger client 601 and the developer always have the most correct information for debugging. In one embodiment, the controller 602 only returns information for processes running on machines for which debugger client 601 has permission to access. If the owner of the machine has not given user permission to the developer or debugger client, then the controller 602 does not identify those software instances to prevent attempts to debug processes for which the developer does not have permission.

Agents 604 are deployed for each software instance 603 or for each machine that is running one or more software instances 603. Agents 604 communicate with the debugger client 601 via controller 602. Agents 604 listen for commands indicating that the developer wants to debug software 603 on the machine. In one embodiment, controller 602 may order agents 604 to configure or setup a machine for debugging. Agents 604 may be software applications that have the capability to download and install a monitor 605. Agents 604 then configure the machine, such as by opening firewall ports, setting proper permissions, etc., so that monitor 605 can run on the machine.

Connector 606 is a software application that runs in the cloud environment. Connector 606 acts as an bridge for connections from debugger client 601 on the public Internet to monitors 605, which are running on machines that are not publically accessible. Connector 606 may be a router, for example, that authenticates the connections and routes requests from debugger client 601 to the appropriate monitor 605.

The agent 604 software may be deployed along with the software code to be debugged, or it may be deployed at a later time.

Figure 7:
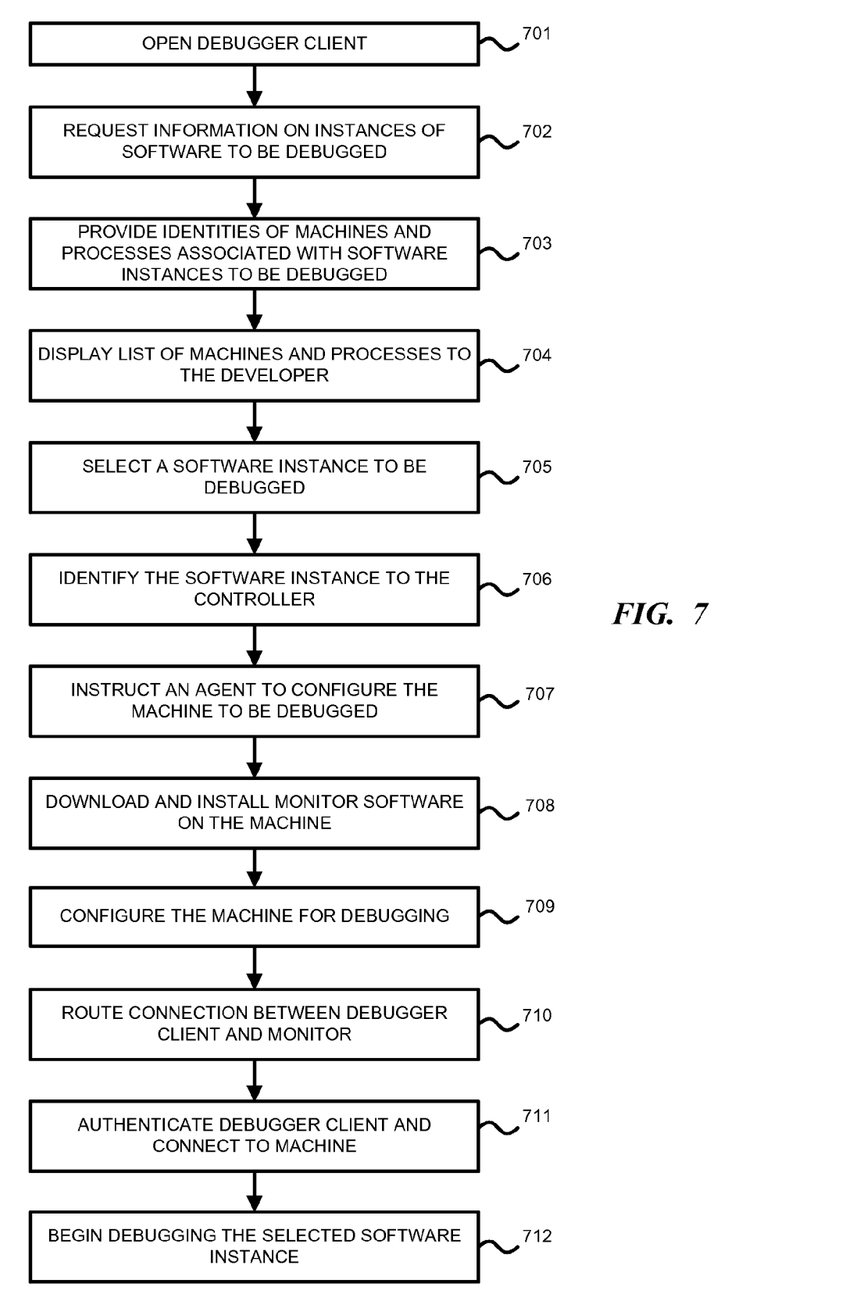
FIG. 7 is a flowchart illustrating a process or method for debugging software on remote machines in a cloud environment.

FIG. 7 is a flowchart illustrating a process or method for debugging software on remote machines in a cloud environment. In step 701, the developer opens a debugger client and select software code to be debugged. In step 702, the debugger client communicates with the controller to identify instances of the software to be debugged that are running in a cloud environment. In step 703, the controller identifies the machines and processes associated with the software instances to be debugged by requesting agent applications on the remote machines for software status information, for example. The agent applications provide software status information to the controller, which then sends a list of machines and process for display to the developer in step 704. Using the debugger client in step 705, the developer selects one or more software instance to be debugged. The software instance may be identified, for example, as a particular process running on one of the machines.

In step 706, the debugger client identifies the software instance to be debugged to the controller. In step 707, the controller then instructs the agent on the machine associated with the software instance to configure the machine for remote debugging. The agent downloads and installs the monitor software on the machine in step 708, if the monitor is not already available. The agent configures the machine in step 709, for example, by adding appropriate permissions and user accounts, opening firewall ports, and starting the monitor software.

The debugger client talks to the connector in step 710, which routes the connection to the appropriate monitor. In some embodiments, the debugger client may not be able to directly reach the software running on the machine. However, the connector provides and manages interfaces between the public Internet and private network connections in the cloud environment. The connector authenticates the debugger client and then connects the client and machine in step 711. The developer may then start debugging the selected remote software instance in step 712.

It will be understood that steps 701-712 of the process illustrated in FIG. 7 may be executed simultaneously and/or sequentially. It will be further understood that each step may be performed in any order and may be performed once or repetitiously in other embodiments.

Figure 8:
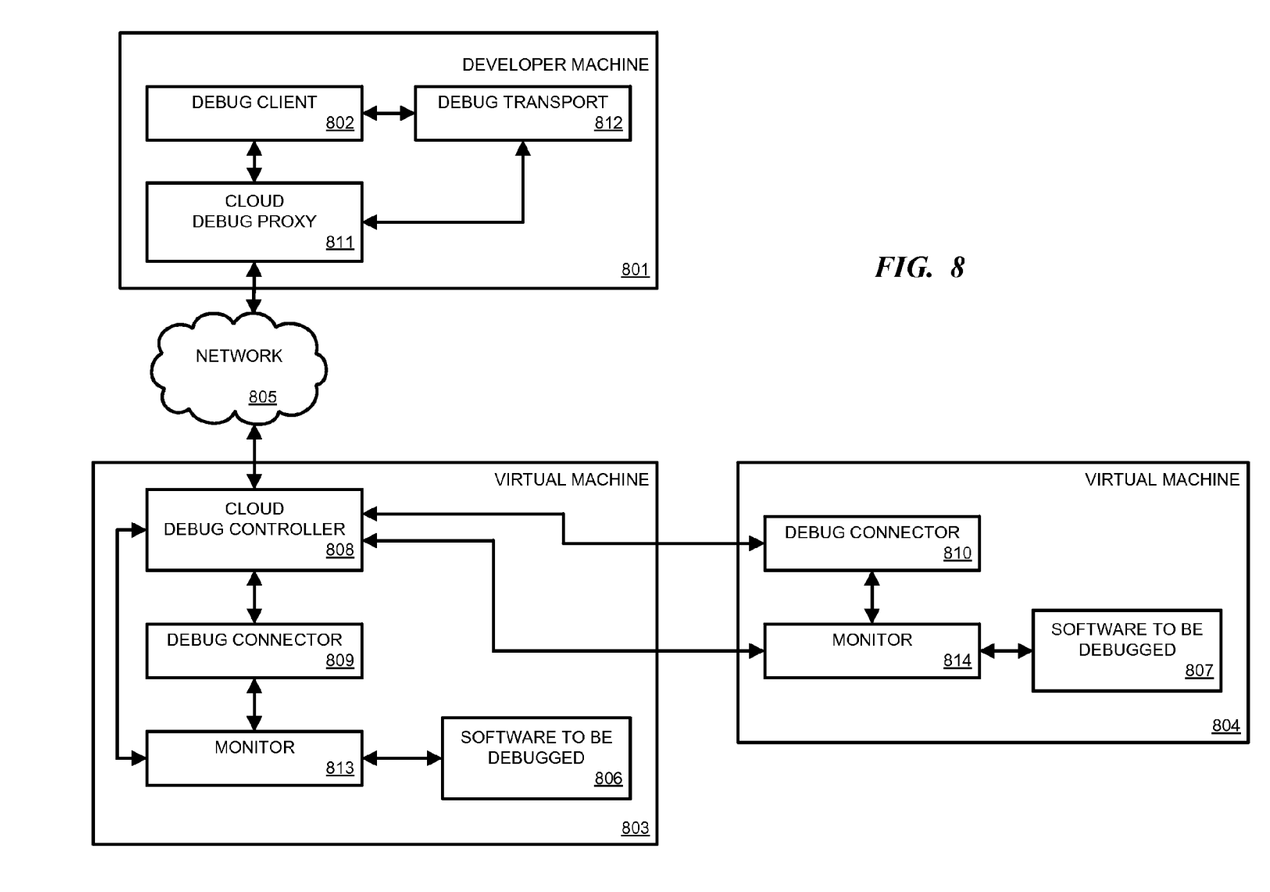
FIG. 8 is a block diagram of a system for remote debugging in a cloud environment according to another embodiment.

FIG. 8 is a block diagram of a system for remote debugging in a cloud environment according to another embodiment. A software developer uses developer machine 801, which is running a debugger client 802, such as an IDE application. The developer may want to debug software on remote machines or servers. As illustrated in FIG. 8, the remote machines may be virtual machines 803, 804 that are in a cloud environment that is accessible only via a public or private network 805, such as the Internet or an intranet.

Multiple instances 806, 807 of the software to be debugged may be deployed on the virtual machines 803, 804. A cloud debug controller 808 is used to identify the instances 806, 807 of the software. In one embodiment, a single instance of the cloud debug controller 808 is deployed to one of the virtual machines 803, 804. Additionally, a debug connector 809, 810 is deployed to every virtual machine 803, 804. Working with the cloud debug controller 808, the debug connectors 809, 810 act as agents to configure the machines 803, 804 to be debugged. The cloud debug connector 808 and debug connectors 809, 810 may be deployed with software instances 806, 807 or loaded at a later time when debugging is initiated on developer machine 801.

Cloud debug controller 808 discovers the topology of the cloud environment using information from the cloud environment runtime and framework. Cloud debug controller 808 discovers the debug controllers 809, 810 and establishes a connect to them. Cloud debug controller 808 acts as a gateway and provides a visible connection into the cloud environment for developer machine 801. Cloud debug proxy 811 provides a bridge between debug transport 812 on the developer machine 801 and the cloud debug controller 808. In one embodiment, debug transport 812 creates a composite view of the cloud topology for the debug client 802. In a cloud computing environment, the machine names, IP addresses, port numbers, and process names for the software instances may change as the workload is dynamically balanced. Debug transport 812 presents the software instances as single application for debugging to debug client 802. In this way, the debug client 802 and the developer do not have to continually track the information for each software instance.

The cloud debug controller 808 and debug connectors 809, 810 identify instances of the software to be debugged. The list of software instances may be filtered to include only those processes that can be debugged by developer machine

801. For example, if the developer does not have permission to access a virtual machine or process or if the owner of the machine has otherwise restricted debug capabilities, software instances on those machines are not be listed to the debug client 802.

Monitor software 813, 814 is loaded onto virtual machines 803, 804 for debugging software 806, 807. Monitor software 813, 814 may be deployed with the software instance or debug connector 809, or may be deployed later by cloud debug controller 808.

To debug software, the debug client 802 sends a request to cloud debug controller 808 to discover the network topology. Cloud debug controller 808 communicates with the connectors 809, 810 and request information about instances of the software to be debugged. The cloud debug controller 808 passes the information to debug client 802, which displays how many machines, processes, and/or software instances have been discovered. The developer may then select one or all of the machines, processes and/or instances to debug. In one embodiment, an interface or visualization is provided that allows users to choose to simultaneously remote debug all instances of a software application that are running on different machines. The user may select this simultaneous debugging across all machines in one action, such as in one click or selection. A connection is then automatically established by the system between debug client 802 and monitor 813, 814 for the selected software instances. The developer may then access the selected software instances via the monitor 813, 814.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
    providing, in a cloud environment by a server, a list of processes available for debugging across two or more virtual machines, the list of processes filtered to show only processes that can be debugged by a developer machine, wherein each of the two or more virtual machines is provided on a distinct physical machine, and wherein each of the two or more virtual machines is configured to execute a different instance of a given process;
    receiving, at the server, a request from a debugging application to debug the given process;
    installing a remote debugger on at least one of the two or more virtual machines and establishing a secure connection between the debugging application and the remote debugger; and
    debugging all different instances of the given process across the two or more virtual machines simultaneously in one action, at least in part, by continuously tracking each instance of the given process and a corresponding machine name as a workload is dynamically balanced in the cloud environment.

2. The method of claim 1, wherein installing the remote debugger comprises:
    loading a remote debugger extension on the at least one of the two or more virtual machines from an extension repository.

3. The method of claim 2, wherein the server hosting the two or more virtual machines and the extension repository are components of a datacenter.

4. The method of claim 2, wherein the server hosting the two or more virtual machines and the extension repository are components of a distributed computing network.

5. The method of claim 1, wherein installing the remote debugger comprises:
    loading a remote debugger installation package on the at least one of the two or more virtual machines from a storage using scripting.

6. The method of claim 5, wherein the storage is a component of a datacenter associated with the distinct physical machines hosting the two or more virtual machines.

7. The method of claim 5, wherein the storage is external to a datacenter associated with the distinct physical machines hosting the two or more virtual machines.

8. The method of claim 1, wherein the secure connection is established between a proxy component at the debugging application and a controller at the remote debugger.

9. The method of claim 8, wherein the secure connection is established between the proxy component and a forwarder component in the controller.

10. A server, comprising:
    one or more processors; and
    one or more computer-readable storage media coupled to the one or more processors, the computer-readable storage media having stored thereon computer-executable instructions that, when executed by the one or more processors, cause the server to:
        provide, in a cloud environment, a list of processes available for debugging across two or more virtual machines, the list of processes filtered to show only processes that can be debugged by a developer machine, wherein each of the two or more virtual machines is provided on a distinct physical machine, and wherein each of the two or more virtual machines is configured to execute a different instance of a given process;
        receive a request from a debugging application to debug the given process; and
        debug all different instances of the given process across the two or more virtual machines simultaneously in one action, at least in part, by continuously tracking each instance of the process and a corresponding machine name as a workload is dynamically balanced in the cloud environment.

11. The server of claim 10, wherein the computer-executable instructions further cause the server to:
    debug all of the different instances of the given process using a remote debugger under control of the debugging application.

12. The server of claim 10, wherein the computer-executable instructions further cause the server to:
    load a remote debugger extension on at least one of the two or more virtual machines from an extension repository.

13. The server of claim 10, wherein the computer-executable instructions further cause the server to:
    load a remote debugger installation package on at least one of the two or more virtual machines from a storage using scripting.

14. The server of claim 10, wherein the controller further comprises a forwarder that provides an interface between a remote debugger and the debugging application.

15. The server of claim 10, wherein the debugging application further comprises a proxy component that supports a secure connection between the debugging application and a remote debugger.

16. The server of claim 10, wherein the debugging application further comprises a proxy component that provides an interface between the debugging application and a remote debugger.

17. A memory device having program instructions stored thereon that, upon execution by a computer system, cause the computer system to method, comprising:

provide, in a cloud environment by a server, a list of processes available for debugging across two or more virtual machines, the list of processes filtered to show only processes that can be debugged by a developer machine, wherein each of the two or more virtual machines is provided on a distinct physical machine, and wherein each of the two or more virtual machines is configured to execute a different instance of a given process;

receive, at the server, a request from a debugging application to debug the given process; and debug all different instances of the given process across the two or more virtual machines simultaneously in one action, at least in part, by continuously tracking each instance of the given process and a corresponding machine name as a workload is dynamically balanced in the cloud environment.

18. The memory device of claim 17, wherein the request comprises instructions to load a remote debugger extension on at least one of the two or more virtual machines from an extension repository.

19. The memory device of claim 17, wherein the request comprises instructions to load a remote debugger installation package on at least one of the two or more virtual machines from a storage using scripting.

* * * * *